(12) United States Patent
Anderson

(10) Patent No.: US 6,563,535 B1
(45) Date of Patent: May 13, 2003

(54) IMAGE PROCESSING SYSTEM FOR HIGH PERFORMANCE DIGITAL IMAGING DEVICES

(75) Inventor: Eric C. Anderson, San Jose, CA (US)

(73) Assignee: FlashPoint Technology, Inc., Peterborough, NH (US)

( * ) Notice: Subject to any disclaimer, the term of this patent is extended or adjusted under 35 U.S.C. 154(b) by 0 days.

(21) Appl. No.: 09/081,694

(22) Filed: May 19, 1998

(51) Int. Cl.$^7$ ................................................. H04N 5/76
(52) U.S. Cl. ................................................... 348/231.2
(58) Field of Search ........................... 348/232, 333.06, 348/333.01, 231, 222, 376, 207, 231.2, 231.3, 231.99, 222.1, 207.99; 358/909.1, 906

(56) References Cited

U.S. PATENT DOCUMENTS 5,881,205 A * 3/1999 Andrew et al. ............... 348/96
6,262,769 B1 * 7/2001 Anderson et al. .......... 348/333.1

* cited by examiner

Primary Examiner—Wendy R. Garber
Assistant Examiner—Rashawn N Tillery
(74) Attorney, Agent, or Firm—Sawyer Law Group LLP

(57) ABSTRACT

An image processing system for high performance digital imaging in a digital camera. The reflected light from an image is focused through a lens and optically filtered. A CCD array converts this image into an electrical signal. This electrical signal is processed and then converted into an equivalent digital signal. A digital signal processor is then used to process the raw digital signal. The DSP includes a capture data path, a data flow control, an image processing data path, a compression/decompression engine, a resize circuit, a display processing circuit, and a rotation circuit. Data is routed between the DSP and memory via a bus. By selectively activating and reusing certain parts of the hardware architecture and various data paths, at least four modes of operation can be supported: live view, instant review, and play mode. Furthermore, the correct image is automatically displayed in all four modes, regardless of the orientation of the image or the physical orientation of the camera (both at the time the picture was taken and at the time the picture is being rendered for display).

18 Claims, 13 Drawing Sheets

IMAGE PROCESSING SYSTEM FOR HIGH PERFORMANCE DIGITAL IMAGING DEVICES

FIELD OF THE INVENTION

The present invention relates generally to digital cameras, and more particularly to an image processing system for high performance digital imaging.

BACKGROUND OF THE INVENTION

Given the rapid advances made in semiconductor technology and digital imaging, it was just a matter of time before digital cameras were developed and introduced. Most digital cameras today are similar in size with and behave similar to conventional photographic cameras. But instead of capturing an image through a lens and recorded onto a photosensitive material as with traditional cameras, digital cameras capture an image using a charge-coupled device (CCD). The composite image is represented by thousands of discrete picture elements, known as pixels. The color of each pixel is given in the form of digital data consisting of binary encoded 1's and 0's. This digital data is then processed and stored into memory (e.g., internal flash memory, external memory cards, buffers, etc.) for subsequent use.

By adopting a digital imaging approach, digital cameras offer several advantages over more traditional cameras because the bits of data can now be more readily manipulated using digital signal processing techniques. For instance, the backside of a digital cameras can be equipped with a liquid crystal display (LCD) screen. In a record mode of operation, the LCD acts as a viewfinder in which the LCD displays objects and scenes in real-time. At any time, the user can click to capture the "picture" displayed on the LCD. In a playback mode of operation, pictures can be displayed on the LCD either individually or in groups of four, nine, or sixteen pictures. Users can manually page through the current archive of stored pictures by pressing the appropriate buttons. Furthermore, a user can instantly delete certain pictures. In addition, pictures can be viewed in full size, scaled down in size, or zoomed to larger sizes. Another benefit is that digital cameras can rotate the orientation of the pictures so as to automatically switch between landscape versus portrait formats. A common feature found in many digital cameras is a burst mode of operation, whereby a single click of a button can cause the camera to take several pictures in rapid succession, thereby creating a film-like sequence of images.

Due to their digital nature and in order to offer these advanced features, modern digital cameras were typically designed using specialized circuitry to handle each of the advanced features. Although this approach makes digital cameras relatively fast, it dramatically increases the overall cost, size, battery consumption, and weight of the digital cameras. In addition, the captured image display might appear to be slightly different than a live-view display if one were to use different circuits and data paths.

One solution to these drawbacks is to couple a generic processor to memory via a bus, where the processor is programmed to perform all of the enhanced functionality's, and digital data is shuttled between the memory and processor via the bus. However, this approach suffers from one major drawback; it is relatively slow. When a user presses a button, he or she expects instant feedback and response. The user does not want to wait the number of seconds it takes to process an image. It has been discovered that the software approach is slow because it primarily suffers from two disadvantages. First, because the advanced features are typically performed by software, it can take a long time to configure and execute the requisite programming steps. Second, the bus speed becomes a limiting factor as large amounts of data need to be transferred between the processor and memory. Essentially, the bus becomes overloaded. The end result is that software-based digital cameras may be too slow to suit the tastes of consumers, depending on the processor/bus combination.

Thus, there is a need for an advanced architecture which facilitates high-speed image processing, offers advanced features, and yet is cost-effective. The present invention provides a novel solution by implementing a special hardware configuration which has been optimized for increased speed. Certain parts and paths of the circuit are reused and shared so as to leverage existing resources with minimal impact on its speed and functionality. By sharing certain resources, duplication is reduced, thereby decreasing costs. Furthermore, the present invention is adaptable to be used in virtually any type of digital camera and CCD array.

SUMMARY OF THE INVENTION

The present invention pertains to an image processing system for high performance digital imaging in digital cameras and the like. The reflected light from an image is focused through a lens and optically filtered. A CCD array converts this image into an electrical signal. This electrical signal is processed and then converted into an equivalent digital signal. A digital signal processor (DSP) is then used to process the raw digital signal. The DSP includes a capture data path, a data flow control, an image processing data path, a compression/decompression engine, a resize circuit, a display processing circuit, and a rotation circuit. Data from the CCD is routed to the capture data path for processing. The processed data is then sent over a main bus to be stored in an input buffer. The data flow control finds the appropriate image data for retrieval. Further processing is performed (e.g., decompressing, line averaging, pixel shuffling, ring insertion, interpolation, edge enhancement, gamma correction, and color space conversion). A JPEG compression/decompression engine compresses the resulting image before it is stored as a file. The JPEG engine can subsequently decompress a file for display. The uncompressed file can first be resized to suit the desire of the user and/or rotated, depending on the current physical orientation of the digital camera and that of the image.

By selectively activating and reusing certain parts of the hardware architecture and various data paths, at least four modes of operation can be supported: live view, capture, instant review, and play mode. In a live view mode of operation, the image from the capture data path is stored in the input buffer of the memory, retrieved and processed by the image processing path, buffered, resized if necessary, and displayed along with any appropriate graphics. In a capture mode of operation, the image from the capture data path is stored in the input buffer of the memory, retrieved and processed by the image processing path, buffered, compressed by the JPEG engine, and stored in a file format. And in an instant review mode of operation, the image from the capture data path is simultaneously resized, if necessary, stored in a display buffer, and displayed along with any appropriate graphics. Lastly, in a playback mode of operation, one or more requested image files are read, decompressed, resized if necessary, and displayed along with any appropriate graphics (e.g., padding or overlay bars).

An orientation detector is used to detect the current physical orientation of the display device so that the image from a first draw buffer can be rotated by the rotation circuit, in accordance with the current orientation, and stored in a second draw buffer. The correct image is automatically displayed in all modes, regardless of the orientation of the image or the physical orientation of the camera (both at the time the picture was taken and at the time the picture is being rendered for display).

By utilizing the optimized hardware design and data paths of the present invention, faster image processing can be achieved with a wide range of features, modes of operation, and enhancements. Furthermore, with the novel layout of the hardware design and data paths of the present invention, certain parts and paths can be used in different capacities and in different modes of operation. This reduces the total amount of hardware which is needed, which minimizes the overall cost with minimal or no impact on speed and functionality.

BRIEF DESCRIPTION OF THE DRAWINGS

The operation of this invention can be best visualized by reference to the drawings.

DETAILED DESCRIPTION

An imaging system for high performance digital imaging devices is described. The following description is presented to enable one of ordinary skill in the art to make and use the invention and is provided in the context of a patent application and its requirements. Although the present invention is described in the context of a digital camera, various modifications to the preferred embodiment will be readily apparent to those skilled in the art, and the generic principles herein may be applied to other embodiments (e.g., digital scanners, video teleconferencing circuitry, multimedia apparatus, digital VCRs, digital camcorders and recorders, etc.). That is, any image capture device which displays images, icons and/or other items, could incorporate the features described herein below and that device would be within the spirit and scope of the present invention. Thus, the present invention is not intended to be limited to the embodiment shown but is to be accorded the widest scope consistent with the principles and features described herein.

Figure 1:
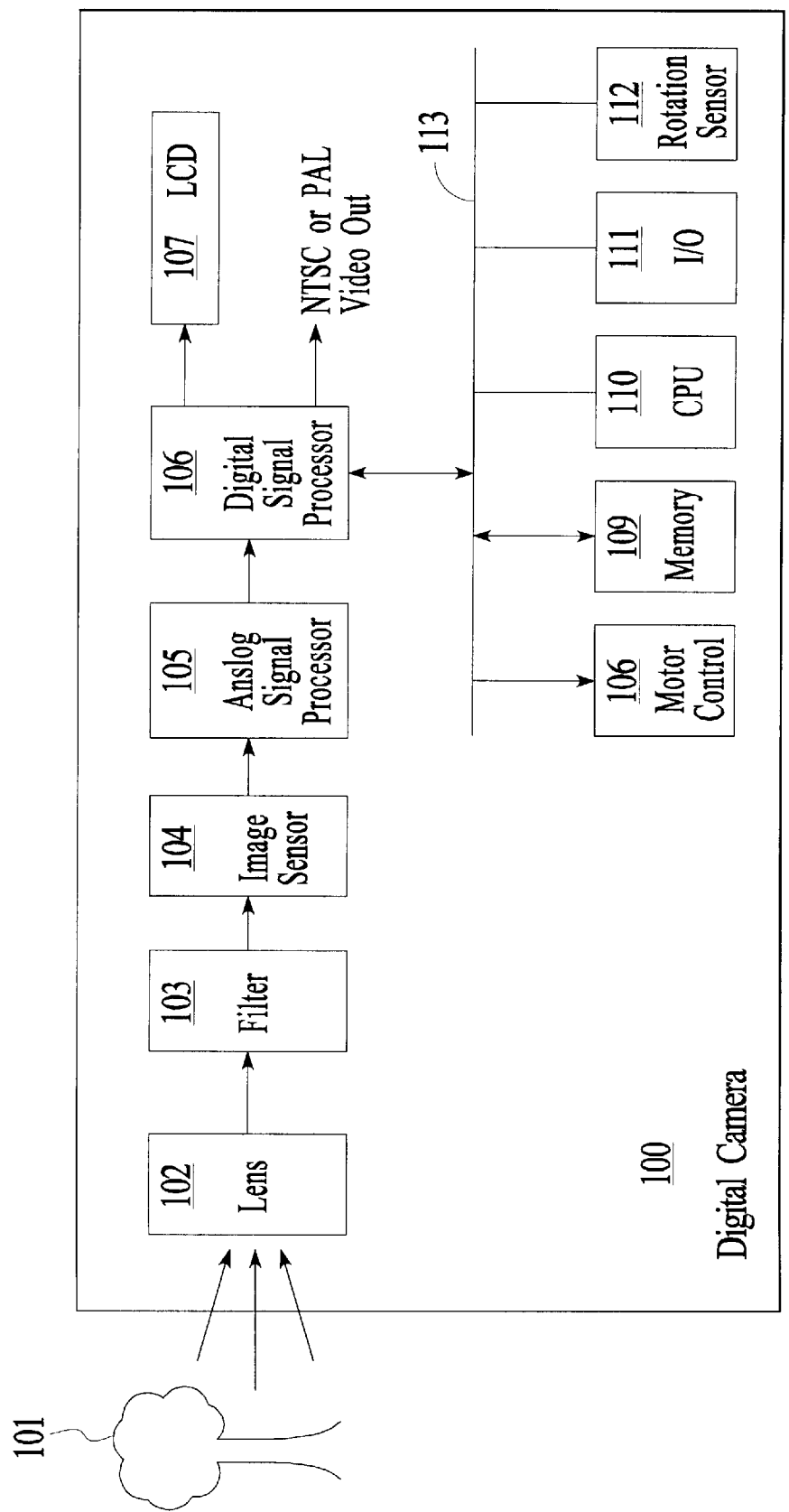
FIG. 1 shows the block diagram of a digital camera upon which the present invention may be practiced.

FIG. 1 shows the block diagram of a digital camera upon which the present invention may be practiced. Digital camera 100 is comprised of a lens assembly 102, filter 103, image sensor 104, analog processor 105, and digital signal processor (DSP) 106. The image of an object or scene 101 is captured by reflected light passing through lens assembly 102. The light is then filtered by a color filter array 103 (e.g., a Bayer array) which provides both luminance and color information pertaining to the image. The image is then converted into an electrical signal by image sensor 104 (e.g., a CCD device). The raw image data (e.g., in CCD format) is then routed through an analog signal processor (ASP) 105. ASP 105 is an ASIC chip which performs several analog as well as digital functions: analog signal processing, bad pixel replacement, pixel averaging, white balance gain control, and analog-to-digital (A/D) conversion. The raw CCD image data is then passed on to the digital signal processor (DSP) 106. The DSP ASIC chip 106 combines the following related functions: front-end pixel data path to a frame buffer, statistics generation, image processing, compression/decompression, live view generation, rotation, resize, video generation, and timing generation. The processed image from DSP 106 is displayed onto a built-in LCD 107. LCD 107 can act as a viewfinder and as a display for captured images. The image signal can also be output from DSP 106 in either an NTSC or PAL format.

A main bus 113 is used to carry data transmissions and/or control signals between the DSP 106 and motor controller 108, memory 109, central processing unit (CPU) 110, input/output (I/O) device 111, and rotation sensor 112. The motor controller 108 controls the motor used in digital camera for physically adjusting the lens assembly 102. Memory 109 is dynamic random-access memory (DRAM) and can include either non-volatile memory (e.g., flash, ROM, PROM, etc.) and/or removable memory (e.g., memory cards, disks, etc.). Memory 109 is used to store raw image digital data as well as processed image digital data. CPU 110 is a processor (e.g., the 823 processor manufactured by Motorola Inc. of Schaumberg, Ill.) which can be programmed to perform various tasks associated with the digital camera 100. The I/O device 111 serves as an interface, whereby the user, through the use of buttons, menus, arrows, overlays, cursors, prompts, etc., can control various functions of the digital camera 100. Rotation sensor 112 senses the current orientation of the digital camera 112 so that captured images can be automatically rotated to the desired landscape or portrait format for display. It should be noted that there are many different configurations which can be used to practice the present invention. In one embodiment, the CPU and the DSP 106 reside on a single chip. In other embodiments, the CPU and DSP reside on two or more separate chips. What is of particular importance is the hardware architecture found in the DSP block 106.

Figure 2A:
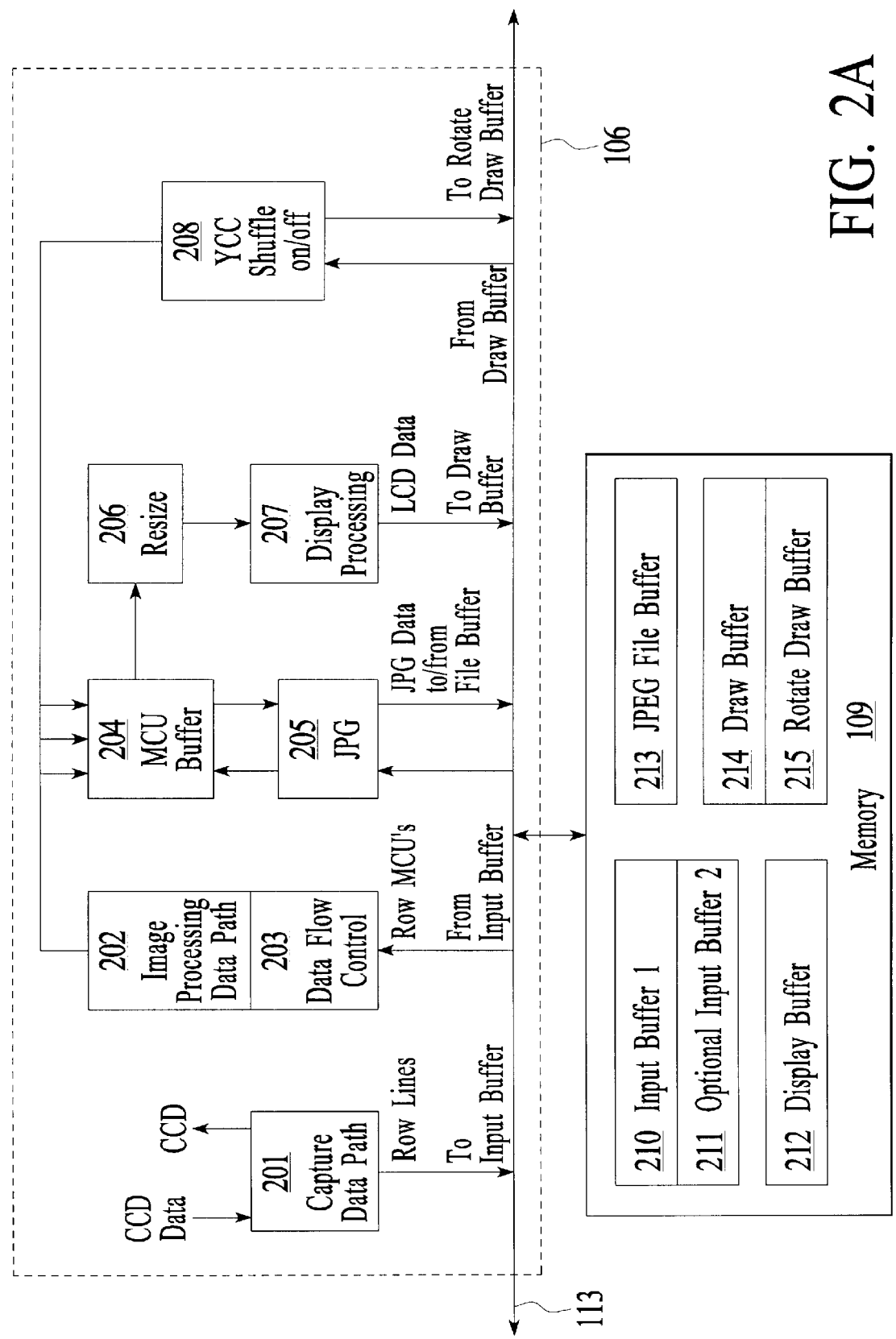
FIG. 2A shows a more detailed block diagram of the DSP and memory.

FIG. 2A shows a detailed block diagram of the preferred embodiment of the DSP 106 and memory 109. The capture data path block 201 basically interfaces with the image capture head (e.g., the CCD). Some of its functions include controlling the CCD driver, performing slight compression, collecting statistics regarding the raw CCD data, generating timing references, and loading the input buffer 210 with the slightly compressed raw data. An optional second input buffer 211 is provided to increase performance using standard "Ping-Pong" buffering techniques. When the image is subsequently requested, it is the job of the data flow control block 203 to locate and fetch the appropriate CCD image data from the input buffers 210 or 211 and pass this raw data to the image processing data path 202. It is the function of the data flow control block 203 to transform raw lines into blocks of pixels called minimum computational units (MCU). The imaging data path block 202 basically takes the raw CCD data and converts it into a real image data capable of being displayed. Some functions involved in this conversion process include edge enhancement, pixel interpolation, ring insert, pixel shuffle, line averaging, gamma correction, and color space conversion. The final output is displayable image data (e.g., in YCC format).

A buffer 204 is used to coordinate the transfer of displayable image data to the JPEG block 205, which compresses the data. The compressed displayable image data is then stored in file buffer 213. The displayable image data can subsequently be retrieved from file buffer 213 and decompressed by JPEG block 205. If necessary, the displayable data can be resized (e.g., enlarged or reduced) by resize block 206. Display processing 207 then performs the requisite graphic functions on the image data in order to generate the final LCD display (e.g., the preferred embodiment is to prepare image data for graphical overlay and do actual graphics by software during the final rendering step, padding, overlays, menus, prompts, date and time stamp, etc.). Note that the graphics overlay and layouts can also be rotated and resized accordingly to fit onto the screen. The LCD display data is temporarily stored in draw buffer 214 before being rendered for display on the LCD screen. If the image needs to be rotated (to the right or left 90 degrees) to obtain the correct landscape or portrait view, the displayable image data is retrieved from the draw buffer 214, and its pixels are swapped accordingly by the YCC shuffle block 208. The rotated image is then temporarily stored in the rotate draw buffer 215. It should be noted that some of the blocks 201–208 can be implemented in software. For example, a portion of the display processing can be performed in software. Although the goal is to increase the overall speed, a part of this architecture can, nevertheless, be implemented as a software process for simplification, size reduction, logic minimization and flexibility purposes. Generally the most computationally complex blocks which are least likely to be replaced by software include the JPEG 205, image processing data path 203, and resizer 206 blocks. Conversely, the entire or parts of the data flow control 203, display processing 207, and/or YCC shuffle 208 blocks can be implemented as a software process.

There are several advantages which makes the hardware architecture of the present invention superior to other configurations. Namely, the same path is used to process live view as well as to process subsequent capture, instant review, and playback views. Bus 113 is used to convey incoming real-time data used for a live view display as well as data that had been captured and stored as a file. Thereby, combinations of blocks 202–208 coupled to bus 113 can accept and process both real-time CCD as well as previously captured and stored file data. Because of this lack of differentiation, the display of real-time images is exactly the same as the display of images for instant review, capture, and playback modes. There are no annoying discrepancies between the various displays.

Another primary advantage is the fact this one hardware architecture of the present invention has enough flexibility and versatility such that it can support all four modes of operation: live view, capture, instant review, and playback. The live view mode causes the actual image that is seen by the camera in real time to be displayed on the camera's LCD. The capture mode of operation stores a picture when the user clicks the shutter button. The instant review mode of operation displays an image immediately after the shutter button is clicked by the person taking the picture. The user can immediately review the picture that was just taken. If the user is not satisfied with the picture, he/she may simply discard that picture and shoot again. Also, capture instant review are essentially simultaneous with this architecture, allowing it to be used to "show" a burst real time as it is captured. The play back mode sequentially displays a series of stored pictures on the LCD. For example, a user may take a rapid series of shots of some event (e.g., a golf swing) and later playback those time-lapsed images. The captured images may be captured in full, quarter, or one-sixteenth size.

Another advantage offered by the present invention is that the present invention provides automatic processing and correct display of the image, regardless of the orientation of the camera (e.g., portrait, landscape, or upside-down) at the time an image was taken and also regardless of the orientation of the camera at the time an image is subsequently rendered for display. The present invention handles live view generation with the camera in either portrait (vertical) or landscape (horizontal) orientation; image capture with camera rotation or without camera rotation; instant review with image rotation, without image rotation, with camera rotation, or without camera rotation; and play mode with image rotation, without image rotation, with camera rotation, or without camera rotation. According to the present invention, all of the above modes and orientations can be accomplished through the use of the same hardware architecture. Each of these four modes of operation, their respective data processing flows, and requisite active blocks are discussed in detail below and in reference to FIGS. 3A–3F and FIG. 4.

Not only does the present invention provide for all the various modes, orientations, and display sizes, but it also leverages each of the blocks 202–208 such that they can be used interchangeably from one mode/orientation/size to the next. Depending on which particular mode/orientation/size is currently desired, certain ones of these blocks 202–208 are activated to achieve the desired results required for that particular mode/orientation/size. In other words, one can selectively utilize certain combinations and data flows to achieve a wide range of desired effects. Hence, the total amount of hardware that is needed to provide all of the above functionality's can be achieved efficiently and economically with minimal impact to bus bandwidth and the camera's overall processing speed. As an example, the resize block 206 is optimized to perform resizing functions. As such, it is used in live view, instant review (rotated and unrotated), and play (rotated and unrotated) modes. However, it is not used during the capture mode. Likewise, the YCC shuffle block 208 is used during the instant review (rotated) and play (rotated) modes. The JPEG block 205 is used to compress data from the MCU buffer for storage in the file buffer 213 during the capture and instant review (unrotated and rotated) modes. Additionally, JPEG block 205 is used to decompress data retrieved from file buffer 213 during the play (unrotated and rotated) mode. A detailed description describing how, when, and why each of the blocks 202–208 are used follows.

Figure 2B:
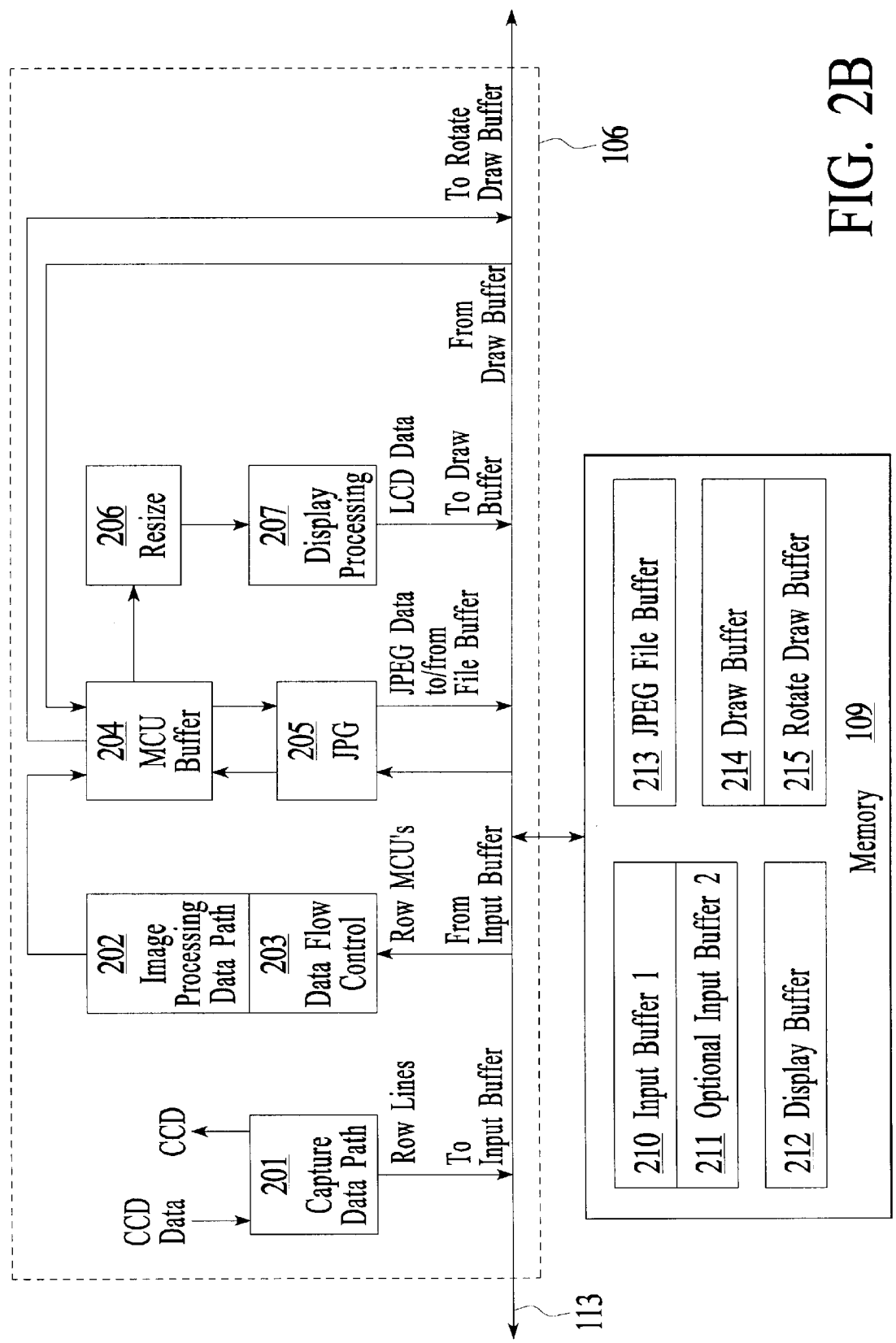
FIG. 2B shows an alternative embodiment of the detailed block diagram of the DSP and memory.

FIG. 2B shows an alternative embodiment of the DSP and memory, whereby a direct path to the MCU is provided.

Figure 3A:
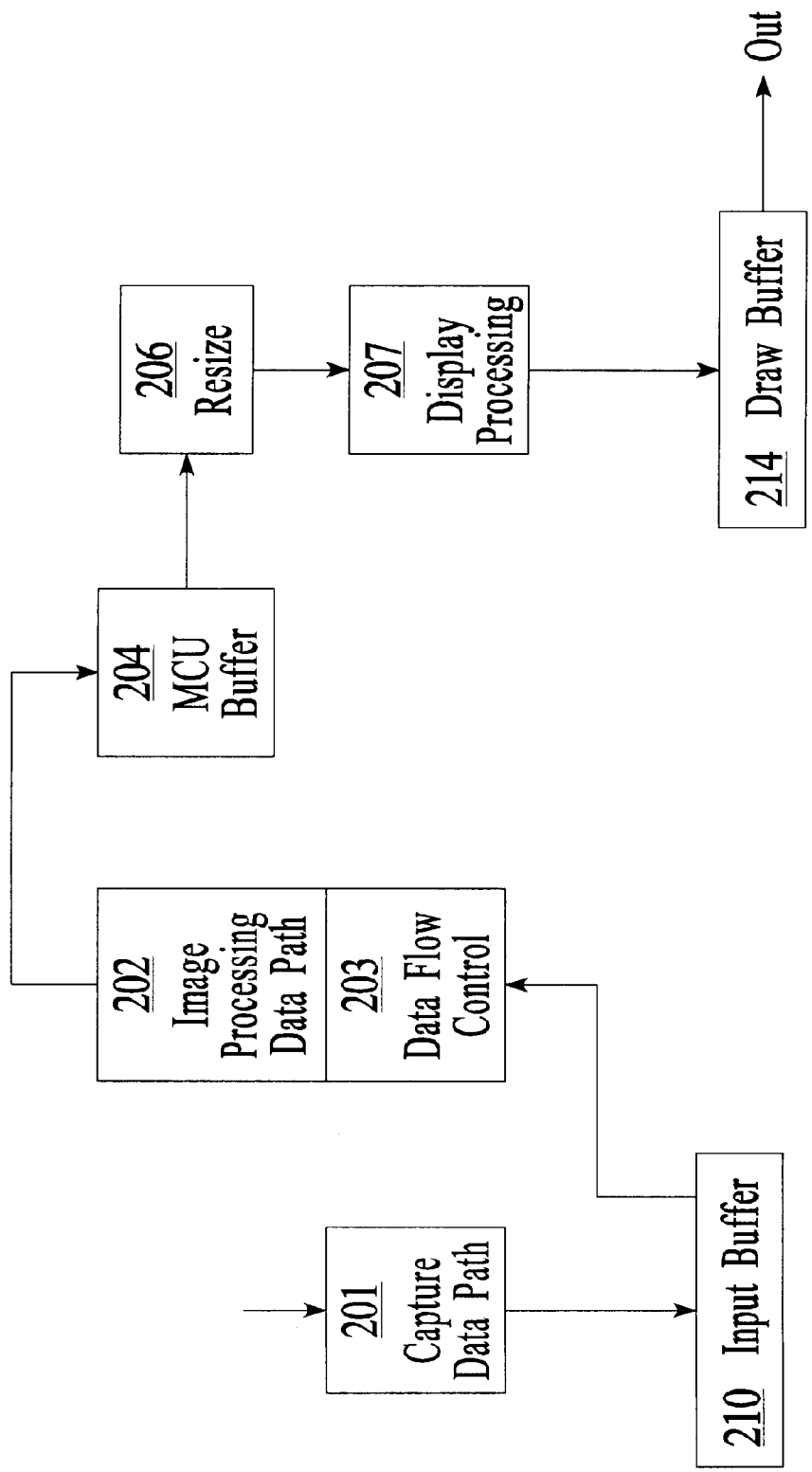
FIG. 3A shows the data processing flow diagram for a live view mode of operation.

Referring now to FIG. 3A, the data processing flow diagram for a live view mode of operation is shown. The live view mode displays on the LCD screen the image that is seen by the camera in real time. As the camera is pointed and moved, the scene on the LCD display changes accordingly. The raw CCD data from the image capture head is input to the capture data path 201, processed, and stored in the input buffer 210. The data flow control 203 retrieves this data which is processed by the image processing data path 202 and sent to the MCU buffer 204. A resize block 206 is used to fit the image captured by the CCD onto the LCD's image size. The requisite display processing is performed in block 207. In the preferred embodiment, when the camera is held horizontally (i.e., landscape), the image is temporarily stored in the draw buffer and fit immediately rendered out for display on the LCD. In a vertical orientation, the data flow control block 203, during live review, ignores the state of the orientation sensor. Thus, the image flow is straight forward because the simultaneous rotation of the CCD and LCD display obviates the need to perform image rotation by the hardware. In one embodiment, the data flow control block 203 determines the order by which data is fed into the image processing data path 202, thereby effecting the rotation of the image.

Figure 3B:
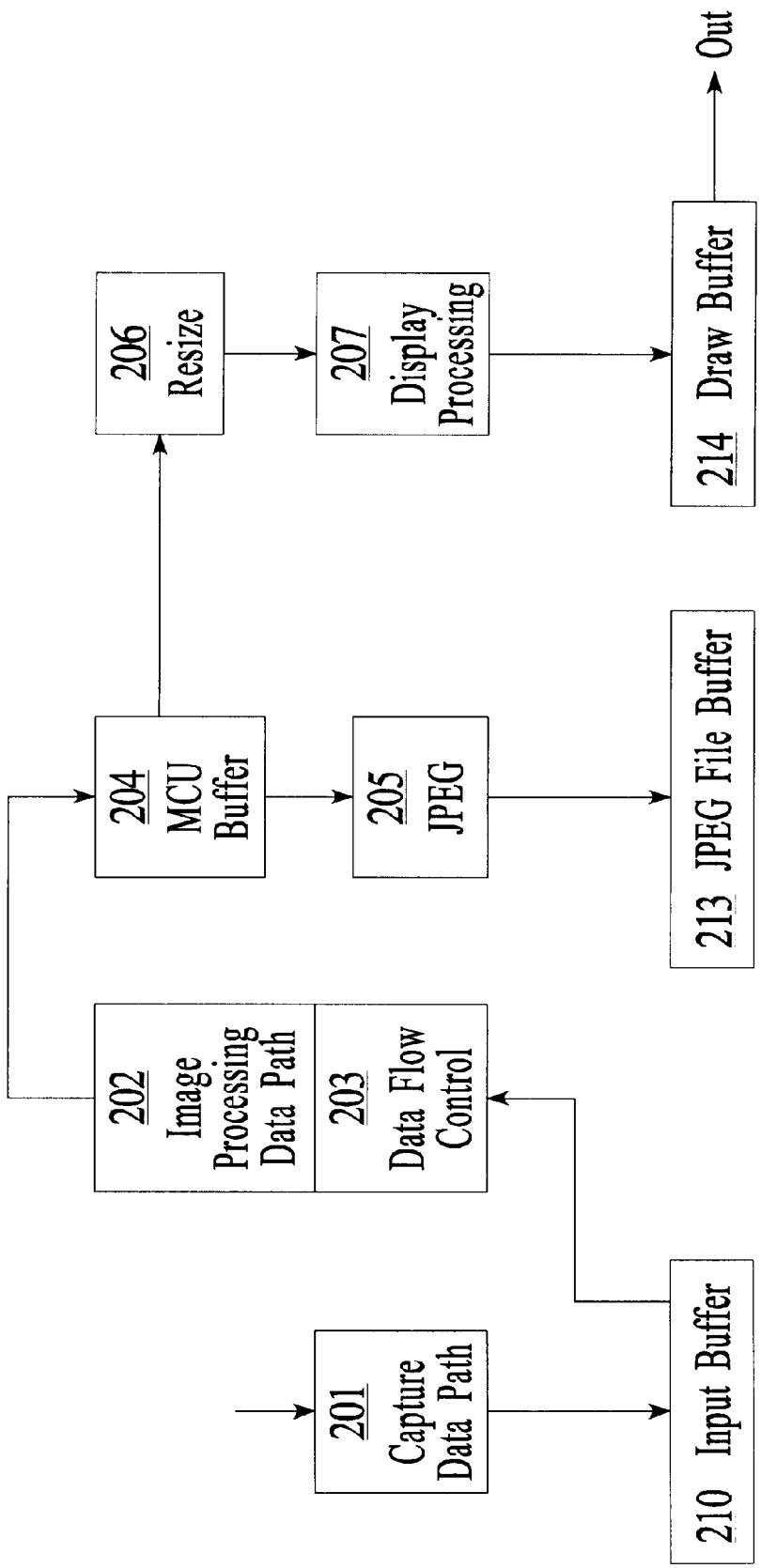
FIG. 3B shows the data processing flow diagram for a capture and instant review mode of operation when the camera is in a horizontal, unrotated position.

FIG. 3B shows the data processing flow diagram for a capture mode of operation when the camera is in an unrotated, horizontal orientation. The capture mode of operation stores a picture when the user clicks the shutter button during the live view mode of operation. The block diagram for capture mode is basically the same as for the live view mode described above, except that the image data from MCU buffer 204 is compressed by JPEG block 205 and stored in JPEG file buffer 213. In addition, the image data from MCU buffer 204 is resized (if necessary) by block 206; graphical information is added by display processing block 207; and the final image is stored in draw buffer 214.

Figure 3C:
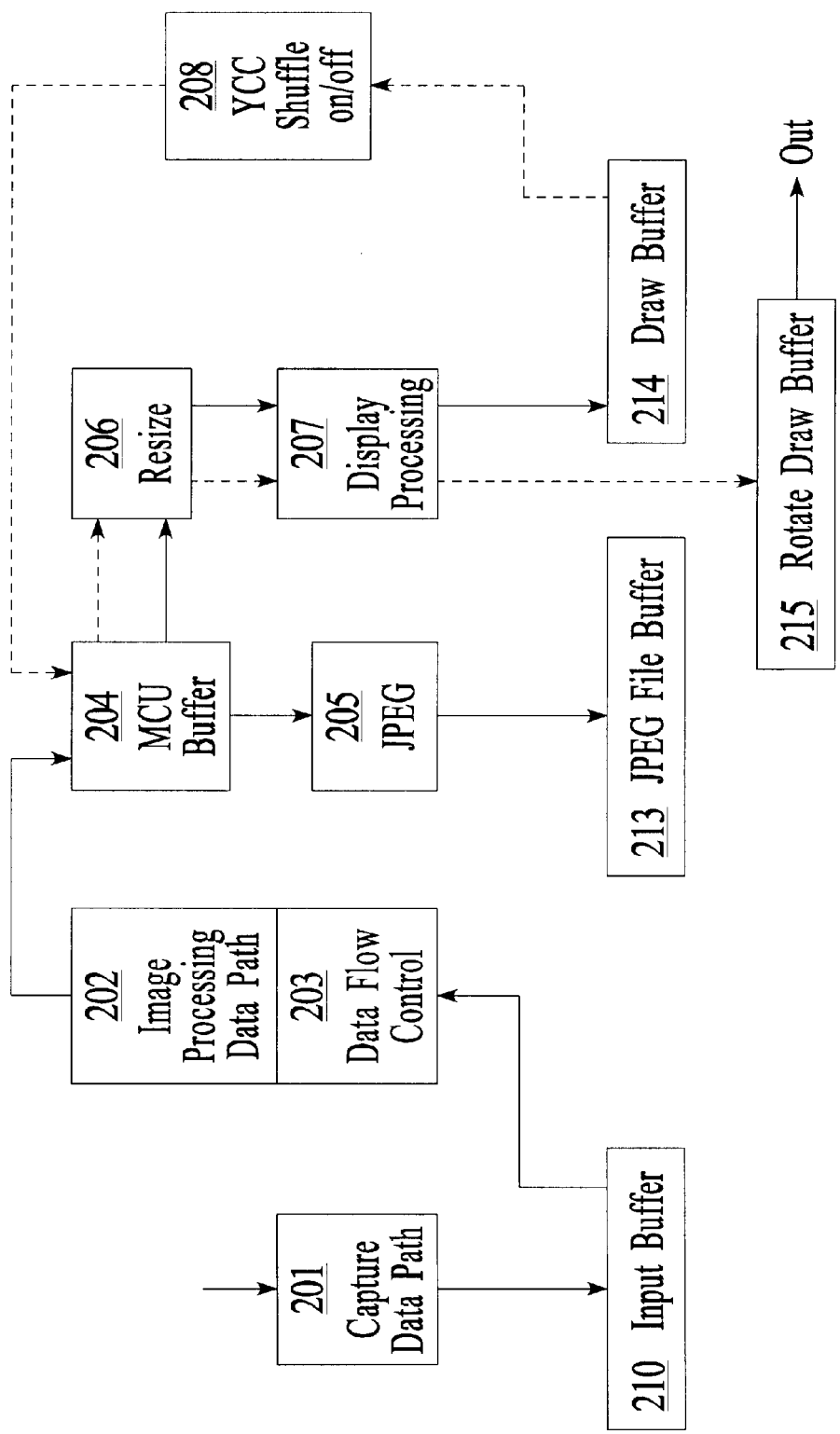
FIG. 3C shows the data processing flow diagram for a capture and instant review mode of operation, whereby the camera is in a rotated position (e.g., portrait state).

FIG. 3C shows the data processing flow diagram for a capture mode of operation when the rotated camera is in a vertical orientation when the shutter button is pressed. In this case, a second pass is needed. A first pass is performed in the same manner as described above for the unrotated capture mode of operation except that data flow control block 203 rotates the image from the frame buffer (always landscape) to the current rotation of the camera (left or right portrait or upside down). Also, the display processing block 207 postpones generation of it's graphical information. A second pass is then performed after the first pass. The second pass is indicated by the dotted lines. In general, the image data from the draw buffer 214 is unrotated by YCC shuffle block 208, which is turned on. The resulting image data is stored back to the MCU buffer 204. From the MCU buffer 204, the image data is fed into resize block 206. On the second pass, a 1:1 resize is performed since the resizing was already performed during the first pass. In effect, the rotation for instant review is canceled because the camera is also rotated. During the second pass, the display processing block 207 generates the graphical information. Thereupon, the image and graphical data is stored in the rotate draw buffer 215 and subsequently rendered out for display.

Figure 3D:
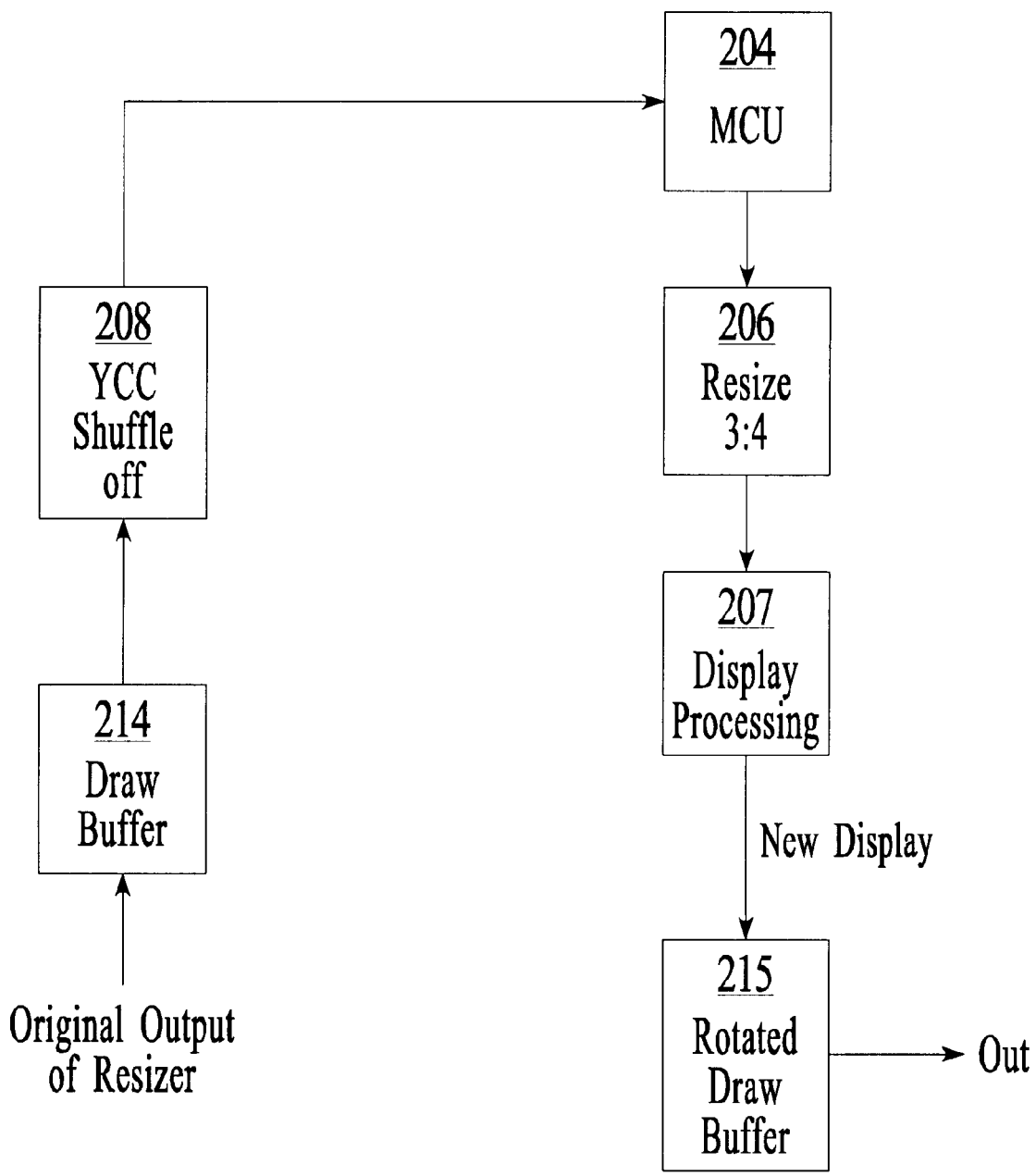
FIG. 3D shows the data processing flow diagram for the post unrotation of an image for instant review.

FIG. 3D shows the data processing flow diagram for the post rotation of an image for instant review. If the camera is rotated back to normal (landscape) orientation while the instant review is still active, (i,e., the camera has not returned to live view mode) the CPU can be programmed to detect this by polling the orientation sensor. If this state is detected, a rotated image can be generated, as described below. The software determines whether the image is currently stored in the draw buffer 214. The image may have been stored in draw buffer 214 as part of the processing flow associated with the capture mode described above and in reference to FIG. 3C. If the correctly rotated image without graphics, is found in draw buffer 214, it is retrieved and passed through block 208 with YCC shuffle turned off. This image is then fed into MCU buffer 204 and then resized 3:4 by resizer block 206 to fit it onto the screen. Display processing block 207 generates the appropriate graphics overlay which is stored along with the image in rotated draw buffer 215. Eventually, this data is read out for display.

Figure 3E:
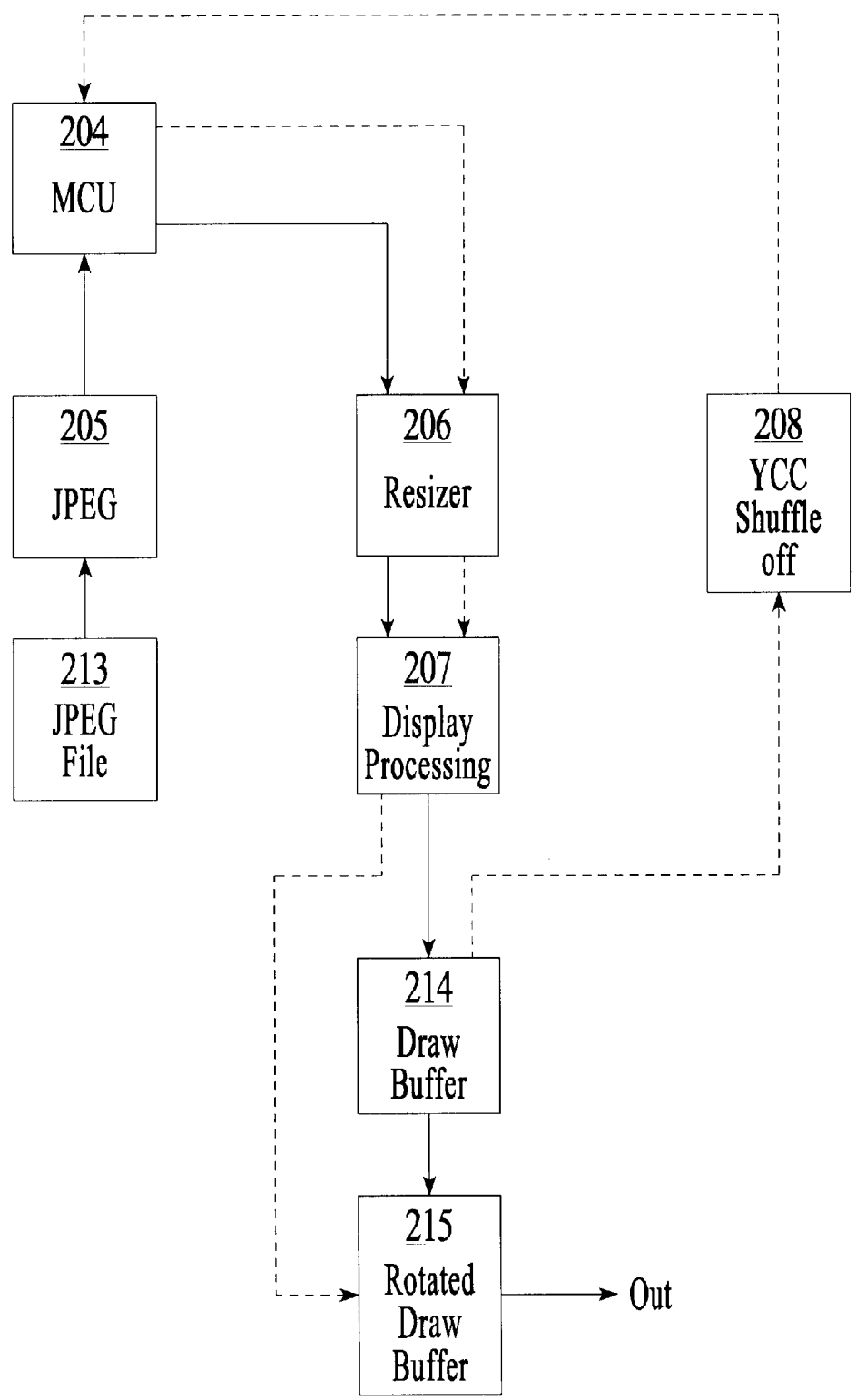
FIG. 3E shows the data processing flow diagram for the post rotation of an image for instant review given that the image is not found in the draw buffer.

FIG. 3E shows the data processing flow diagram for the post rotation of an image for instant review given that the image is not found in the draw buffer or it only exists with graphics data. Assume as with the previous case that the camera is in a rotated orientation when the shutter was clicked to capture an image. Now, user rotates the camera back to an unrotated orientation (e.g., landscape) for instant review of the captured image. Assume also that the image is not found in the draw buffer (e.g., the image in the draw buffer was discarded in order to free up additional memory). In this case, the image in the form of a JPEG file 213 is processed by JPEG engine 205 before being fed into the MCU buffer 204. Resizer 206 is used to fit the image, which is rotated with respect to how it was captured (e.g., portrait), to the correct size of the screen. In this first pass, the display processing 207 is turned off so that graphics is not generated. The image is then temporarily stored in the draw buffer 214. In a second pass, represented by the dashed lines, the rotated image in the draw buffer 214 is fed through block 208 with YCC shuffle turned off. After passing through MCU buffer 204, the image is reduced by 35% so that it will fit into the landscape mode screen. Otherwise, it would be too tall to fit. The appropriate display processing 207 is performed to generate the graphics. Thereupon, the graphics and processed image is stored in the rotated draw buffer 215 before being drawn for display. Note that both passes can be accomplished in one step if the needed resize ratio is available.

Figure 3F:
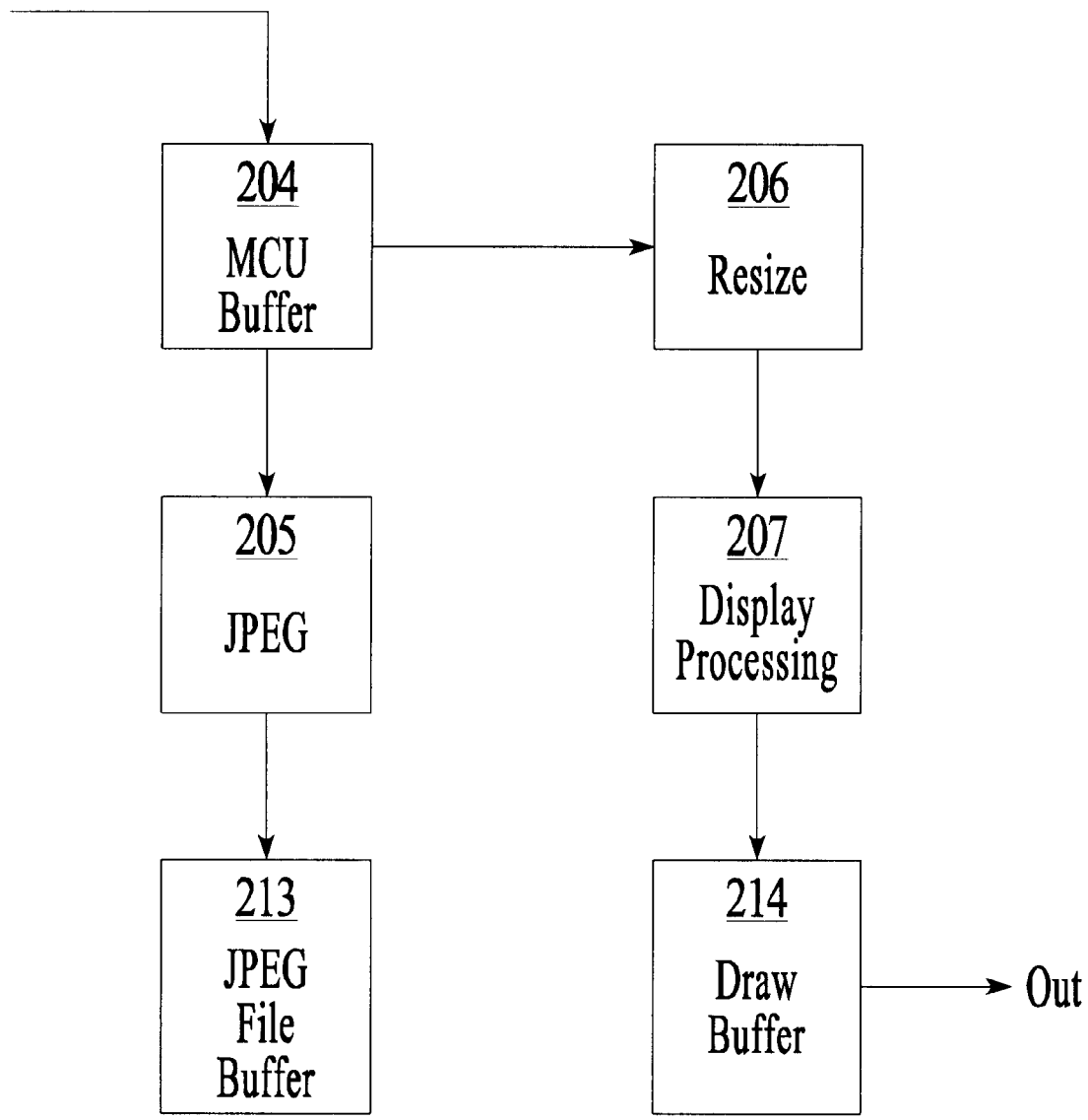
FIG. 3F shows the data processing flow diagram for a normal, unrotated play mode of operation.

FIG. 3F shows the data processing flow diagram for a play mode of operation when the image and camera are both in horizontal orientation or both are in vertical orientation. In a play mode, one or more pictures are sequentially rendered for display on the LCD. The requested picture or pictures are retrieved from the JPEG file buffer 213 and decompressed by JPEG block 205. The decompressed image data is then sent to the MCU buffer 204 which coordinates the data transfer to the resize block 206. The images can then be scaled down (e.g., to a LCD size) or zoomed (i.e., enlarged) by resize block 206. The requisite display processing by block 207 is performed, and the image is then sent to the draw buffer 214 to be rendered for display on the LCD screen.

Figure 3G:
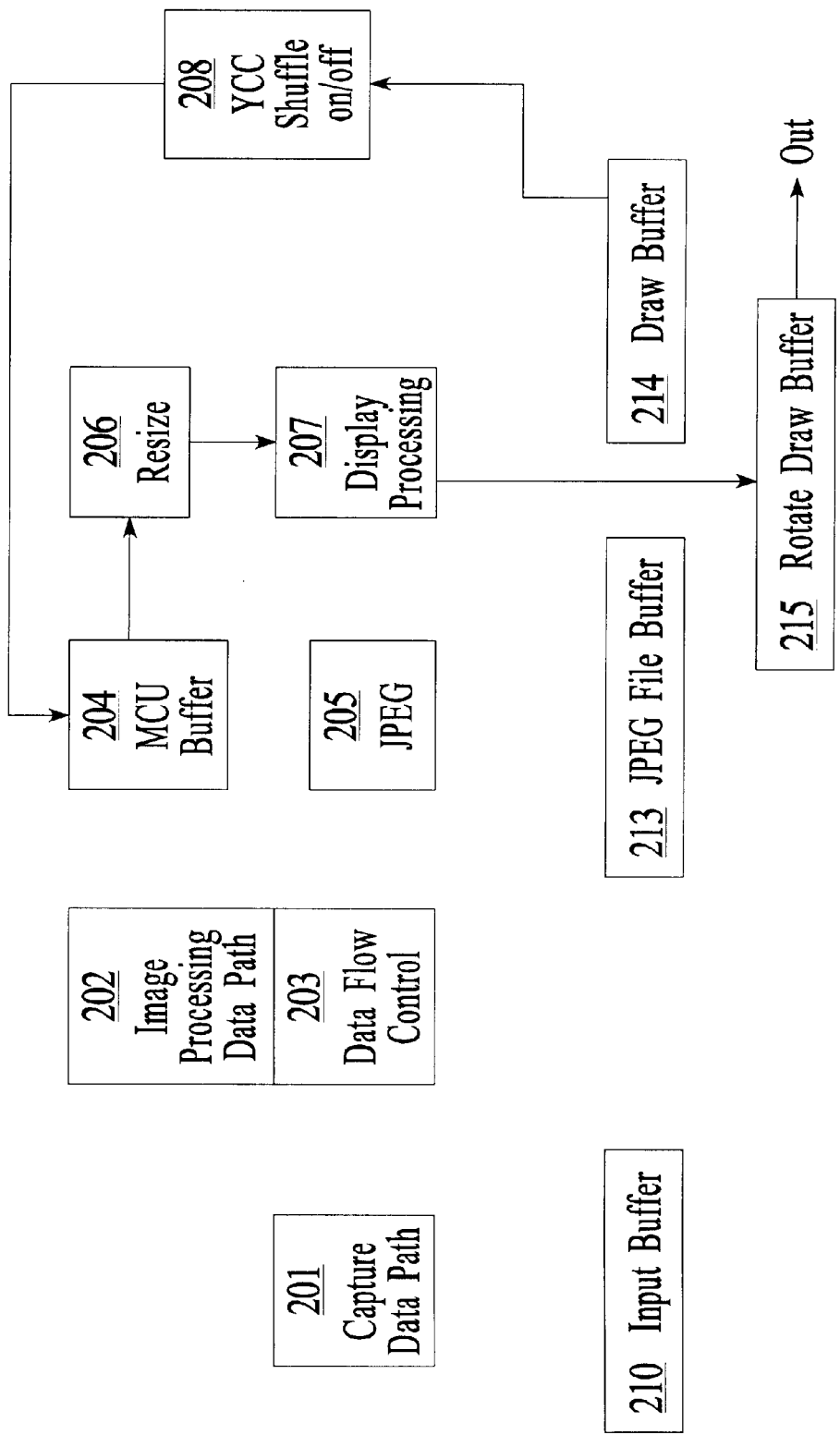
FIG. 3G shows the data processing flow diagram for a rotated play mode of operation.

FIG. 3G shows the data processing flow diagram for a play mode of operation when the camera is currently in a vertical orientation and the image is in a horizontal orientation or if the camera is in a horizontal orientation and the image is in a vertical orientation, as determined by the rotation sensor. In either case, the same flow is followed as described above in reference to FIG. 3E, except that a second pass is performed and display processing if turned off on the first pass. For the sake of clarity, only the flow diagram corresponding to the second pass is shown. The image data in draw buffer 214 is fed back to the YCC shuffle block 208. The YCC shuffle block 208 rotates the image by shuffling the pixels. The rotated image is then resized by resizing block 206 because its dimensions have changed.

After the appropriate display processing by block 207, the rotated, resized image is then sent to the rotate draw buffer 215 to be rendered for display on the LCD screen.

Figure 3H:
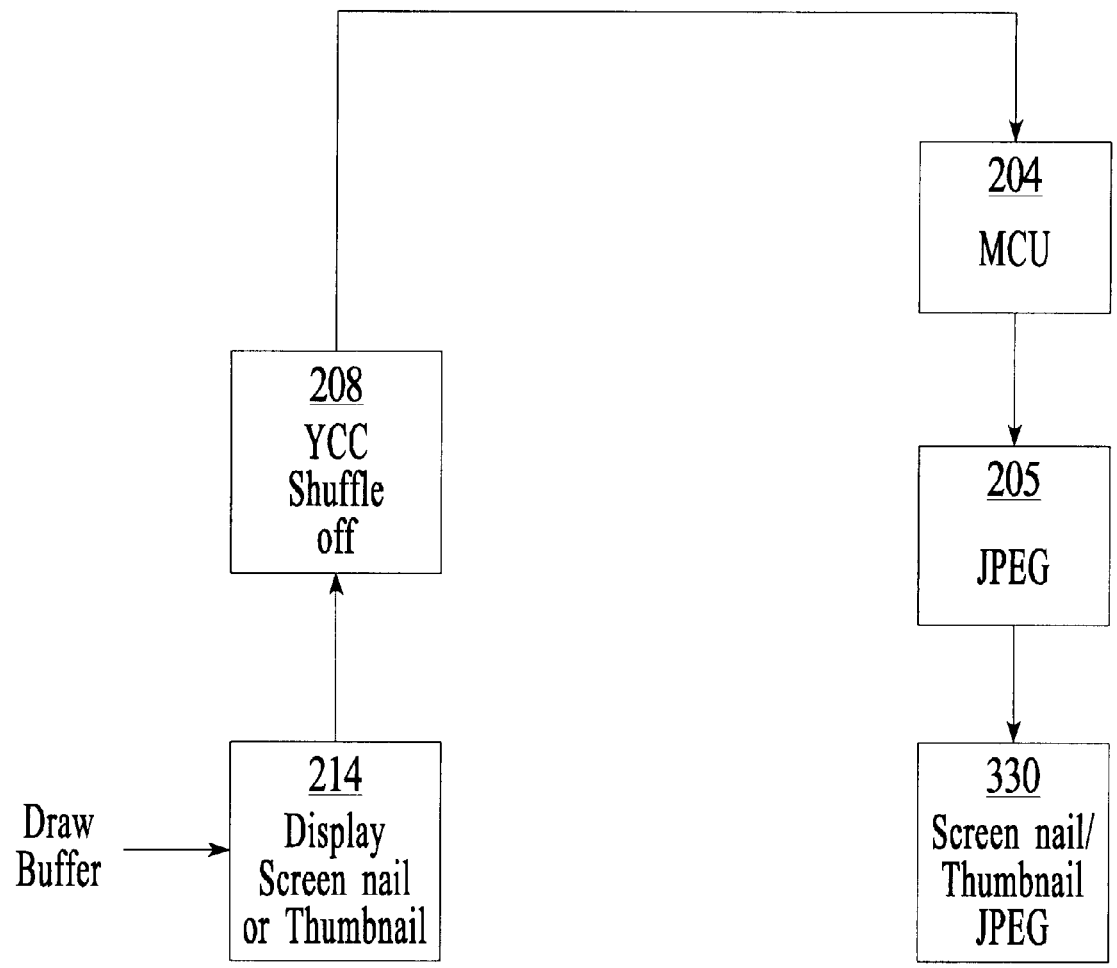
FIG. 3H shows data path flow diagram for generating compressed screen nail or thumb-nail images.

FIG. 3H shows a data flow diagram for generating compressed screen-nail or thumb-nail images. There is a direct path from the YCC block 208 to the MCU block 204. This allows resized images to be compressed (e.g. screen-nails). Note that this only allows compression or resizing of existing image; rotation or unrotation would be performed in software. Alternatively this path may be eliminated by performing the same function in software.

Figure 3I:
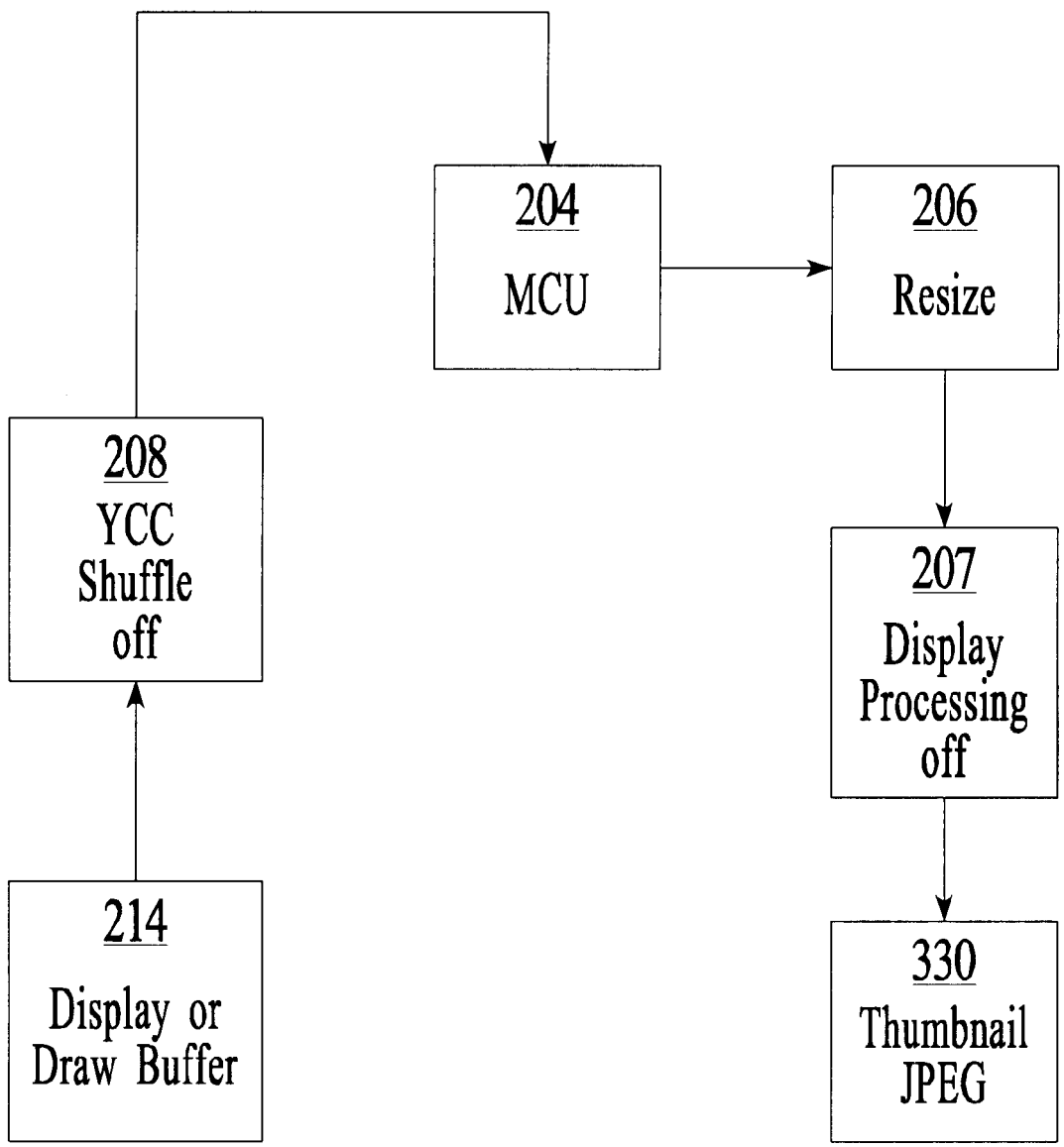
FIG. 3I shows data path flow diagram for generating thumb-nail from screen-nail.

FIG. 3I shows a data flow diagram for generating a thumb-nail image from a screen-nail image.

It can be seen based on FIGS. 3A–3I and the descriptions given above that the same set of blocks 201–208 or circuits can be used to achieve virtually any mode, orientation, or display size for a digital camera. The only thing that changes is the selection of the appropriate data path(s) and the activation of selected blocks. Although the final hardware architecture of the present invention appears straightforward in retrospect, it was deceptively difficult to conceive. This is because one has to first decide on which blocks are to be implemented and define each block's respective functions. Duplication must be minimized. Next, the data paths must be laid out so as to interconnect the various blocks in such a manner that certain combinations produce all of the desired results correctly. Flexibility, adaptability, and high functionality are key. Moreover, the data must be routed through the various data paths as fast as possible so that there is no bottleneck in any one path that might reduce the overall bandwidth. Other considerations include which ones of the blocks should be activated and under what circumstances should they be activated. All these factors were taken into account in order to produce the integrated solution of the present invention which effectively and efficiently utilizes the available hardware resources.

Figure 4:
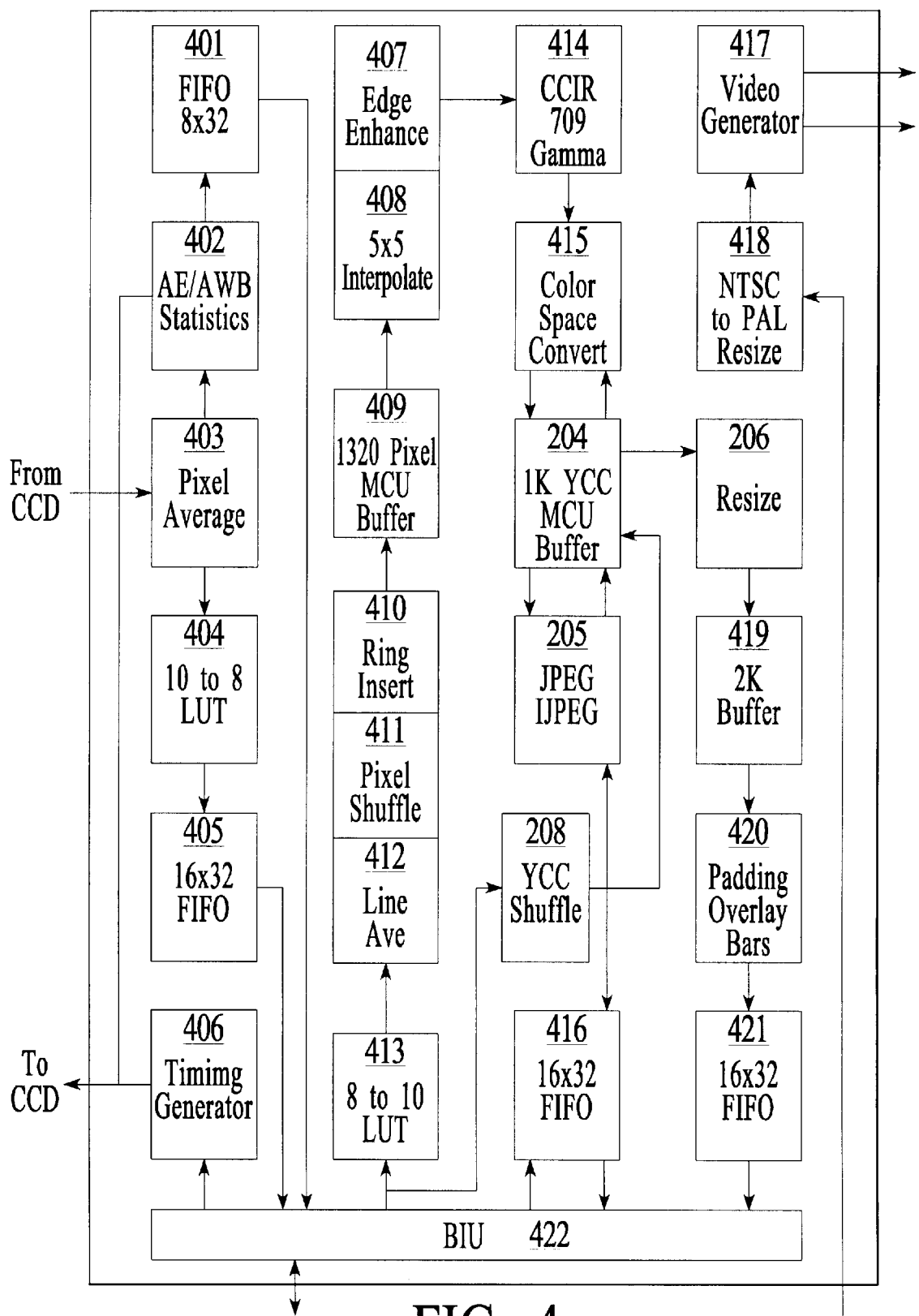
FIG. 4 is a detailed block diagram of the currently preferred embodiment of the digital signal processor.

The actual circuits that were implemented for each of the blocks are now described with reference to FIG. 4. It should be noted, however, that there exist many different circuits which can be used to implement the present invention. For example, there are many different ways in which a resize circuit or a rotate circuit can be designed. The following description relates to the currently preferred embodiment of the digital signal processor 106. In general, the capture data path comprises of the FIFO 401, AE/AWB statistics 402, pixel average 403, 10 to 8 LUT 404, and 16×32 FIFO 405 blocks. The image processing data path and data flow control consists of the edge enhance 407, 5×5 interpolate 408, 1320 pixel MCU buffer 409, ring insert 410, pixel shuffle 411, line average 412, 8 to 10 look-up-table (LUT) 413, CCIR 709 gamma, and color space converter 415 blocks.

In the currently preferred embodiment, data is processed in blocks known as MCU's-minimum computation units. An MCU is defined and well known in the art of image processing, especially as they relate to YCC 411, YCC 422, and discrete cosine transformations (DCTs). The primary method of achieving processing compatibility between these data paths involves storing raw CCD data from the capture data path into memory in line format to support image rotation while reducing bus bandwidth, and to then transform the raw lines in memory into raw MCU's, which are necessary to support the image processing and compression chain. Each of the specific blocks are described in detail below.

Starting with the raw CCD data generated by the CCD array (or some other equivalent image capture head), this data is input to the pixel average block 403. The pixel average block 403 performs pixel averaging to reduce lines to half and quarter length. The averaging is performed by adding values and shifting as follows:

Full Output: Ra, Ga, Rb, Gb, Rc, Gc, Rd, Gd

Half Output: (Ra+Rb)/2, (Ga+Gb)/2, (Rc+Rd)/2, (Gc+Gd)/2

Quarter Output: (Ra+Rb+Rc+Rd)/4, (Ga+Gb+Gc+Gd)/4

It should be noted that this block 403 does averaging of pixels on a line. The compliment function, line averaging, is done when the data is returned to the ASIC for image processing. In this case, MCU's are returned, making it easy to do the line averaging. This dual process eliminates aliasing in the image for 1/4 and 1/16 resolution captures. For 1/16 capture, CCD line skipping (e.g., 2 out of 4) may be used without serious image quality effects. However, for 1/4 capture, line skipping should not be used. During live view mode, typically the CCD is being scanned using line skipping, for 50% vertical resolution, reduced bus bandwidth, and faster frame rate. As can be seen from Table 1 below, for CCD's 1152 and larger, 1/16 mode is used for live view. To accomplish this, a combination of 2 out of 8 line skipping and Quarter Output is used. This is necessary to provide sufficient read-out speed for large CCD's, as well as keeping the bus bandwidth low enough during live view. It should be noted that using 1/4 or 1/16 size in live view is optional.

TABLE 1

CCD Size and Live View Size Table

| Image Size | | 1/4 Image Size | | 1/16 Image Size | | M Pixels |
|---|---|---|---|---|---|---|
| 640 | 480 | <u>320</u> | <u>240</u> | 160 | 120 | 0.31 |
| 768 | 576 | <u>384</u> | <u>288</u> | 192 | 144 | 0.45 |
| 896 | 672 | <u>448</u> | <u>336</u> | 224 | 168 | 0.61 |
| 1024 | 768 | <u>512</u> | <u>384</u> | 256 | 192 | 0.79 |
| 1152 | 864 | 576 | 432 | <u>288</u> | <u>216</u> | 1.00 |
| 1280 | 960 | 640 | 480 | <u>320</u> | <u>240</u> | 1.23 |
| 1536 | 1024 | 768 | 512 | <u>384</u> | <u>256</u> | 1.58 |
| 1536 | 1152 | 768 | 576 | <u>384</u> | <u>288</u> | 1.77 |
| 1792 | 1344 | 896 | 672 | <u>448</u> | <u>336</u> | 2.41 |
| 2048 | 1536 | 1024 | 768 | 512 | 384 | 3.15 |

*Live view sizes to resizer are shown underlined

The AE/AWB statistics block 402 receives its data from the Pixel Average block 403 (either the Half Output or Quarter Output, depending on CCD size). This size is used by the statistics circuit. This is done by selecting one of two outputs from the Pixel Average block 403, and doing either 2/4 or 2/8 line skipping. Since actual line skipping may also be done, this setting must be set taking into account the Timing Generator 406 setting. In any case, the resulting data used by the statistics circuit is between 288 wide and 512 wide, with the corresponding height. The AE/AWB block 402 generates an 8×6 set of averages for normal 4:3 CCD's, and 8×4 set of averages for 3:2 CCD's. This is accomplished by varying the block size depending on the CCD size. Furthermore, the AE/AWB Statistics block 402 needs to be capable of handling the pixel offset during a rotated capture sequence. In addition, it optionally collects "sum of absolute differences" for each of the statistics blocks to assist in providing automatic focus.

The FIFO 8×32 block 401 receives the data from the AE/AWB statistics block 402 and requests a DMA transfer when the buffer has 32 bytes (half full). This FIFO 401 supports quad word transfers. The pixel average block 403 also supplies its 10-bit data to the 10 to 8 LUT block 404, which converts it into an 8-bit compressed data. This LUT block 404 reduces the memory footprint for CCD data, but without loss of image quality.

Thereupon, the 16×32 FIFO 405 takes data from the LUT 404 and requests a quad or octal DMA transfer when half full. In addition to the octal transfer, the DMA for this data also supports interlacing. This is required since many large CCD's utilize an interline scan method for full resolution capture, where 25% or 50% of the lines are transferred per scan.

The data from FIFO 405 is then sent to the memory over a 32-bit bus via the bus interface unit (BIU) 422. Most transfers over this bus between memory and the DSP are in quad, octal, or programmable length bursts to increase bus bandwidth. In addition to the DMA interface, there are a number of registers inside the DSP ASIC which are accessible by software. The BIU 422 gives bus read/write access to these registers. See U.S. application Ser. No. 08/916,186, "Method & System for Organizing DMA Transfers to Support Image Rotation", filed Aug. 21, 1997, assigned to assignee of the present application and incorporated herein by reference. In another embodiment, access can be achieved through a serial port. In this case, double buffering of registers is required, due to slow transfer rates. Transfer between buffers is activated at frame boundaries.

The timing generator 406 supports 2/4 and 2/8 line skipping—either by actual CCD line skipping or by not clocking data from the A/D into the DSP ASIC, depending on CCD capability. In addition, the active pixel election during capture takes into account the required offset for the Bayer pattern for left or right portrait rotation. This requires shifting the active area either one column right or one line down, depending on which rotation is required.

FIG. 5 shows how the active pixels are selected for a 8×6 imager, assuming the landscape orientation. As shown, the pixels used are exactly 8×6. Ring pixel insertion is done at a different stage in the process. The extra "available" pixel and line are unused in this case. A left portrait is when the user rotates the camera clockwise, looking from the rear. This requires the top of the portrait image to be on the left side of the landscape image. The image data shuffle is a right rotate in this case. A right portrait is when the user rotates the camera counter-clockwise, looking from the rear. This requires the top of the portrait image to be on the right side of the landscape image. The image data shuffle is a left rotate.

FIG. 6 shows how the pixel selection is shifted for left and right portrait capture. The capture is shifted right one pixel for left portrait, and is shifted down one pixel for right portrait. This preserves the sequence of GB/RG once the pixels are shuffled into the correct positions. In addition to the above modes, the "upside down" mode may also be supported. This mode is required for cameras where the lens can be rotated 180 degrees for a self-portrait. A sensor determines when the lens has reached 180 degree position, and tells the software to invert the image. Actually, the software "flips" the image both left to right and top to bottom. The pixel offset required for this is shown in FIG. 7. The data is actually upside down in the frame buffer. This can be corrected by either the DMA on the way into the frame buffer, or the DMA on the way out of the frame buffer.

The Timing Generator 406 must also be able to set the active area independently of the actual CCD imager size. This functionality is required for digital zoom. The present invention allows all of the standard image sizes to be captured from a CCD which are equal or smaller than the CCD size. This enables a 5-step zoom for each 2× of zoom. For example, if the CCD is 1152×864, the steps supported are: 1024, 896, 768, 640, 576 (2×), 512, 448, 384, 320, and 288 (4×). Furthermore, the timing generator 406 has many control registers, which must be accessible via the system bus or a second control bus.

Data from memory is fed via the BIU 422 to the 8 to 10 LUT block 413, which takes data from the frame buffer and decompresses it back to 10 bit linear data. This may require a RAM table look-up. Alternatively, a specific version can be produced to reduce ASIC size.

From the LUT block 413, the data is sent to the ring insert 410, pixel shuffle 411, and line average 412 blocks. It should be stressed that there are many different ways, besides these three particular blocks, in which to implement these functions. First, the line average block 412 averages 4 lines into 2, or simply passes the data through without change. When this function is turned on, the DMA feeds twice as many lines per block. The number of lines of pixels required is defined in the ring pixel insert block 410. This block is used in conjunction with timing generator line skip 2/4 or 2/2 and pixel average 2/4 or 2/8 to build high quality 1/4 and 1/16 size images for capture. Normally, for live view, this function is turned on to produce an image size for 288 to 512 horizontally. The mode selected depends on the CCD size. Of course, one can implement a resizer capable of resizing to any given resolution.

When the line average function is turned on, the DMA moves blocks which are twice as high (i.e., contains twice as many lines) as when the line average function is turned off. These lines are averaged down, using a similar process as used for pixel averaging. This is demonstrated for two pixels per line below:

| Line 1 input  | Ra          | Ga          |
| Line 2 input  | Gb          | Bb          |
| Line 3 input  | Rc          | Gc          |
| Line 4 input  | Gd          | Bd          |
| Line 1 output | (Ra + Rc)/2 | (Ga + Gc)/2 |
| Line 2 output | (Gb + Gd)/2 | (Bb + Bd)/2 |

The line average block 412 requires a single control bit: 1=line average, 0=off.

Second, the pixel shuffle block 411 rearranges the data for portrait left and right cases and in one embodiment, upside down case as well. This is illustrated for 4×4 blocks, as shown in FIG. 8. This process can be accomplished by addressing the data correctly as it is moved into the pixel MCU buffer 409. The pixel shuffle block 411 requires two control bits to indicate rotation: 00=landscape, 10=left rotate, 01=right rotate, and optionally 11=upside-down.

Third, the ring insert block 410 is responsible for insertion of ring pixels at the edges of the image. The proximity to the edge is provided by data in control registers. This information is also required for the DMA function, since a different amount of data must be transferred when at the image edge. FIG. 9 shows how data is transferred by the DMA to support data in Live View and Landscape Capture. Note that the first and last pass across the data is different than all passes away from the top and bottom of the image. This is because there are no ring pixels in the frame buffer. Also note that each successive pass rescans four lines from the previous row. This is necessary to provide the full overlap of data for the interpolator. The DMA must back up four lines at the beginning of each row to accomplish this. However, if the line average function is turned on, the DMA will actually have read 36 or 40 lines of data, rather than 18 or 20.

A portrait DMA scan is similar to landscape, but proceeds in different directions. Since DMA cannot really transfer words on a non-longword boundary, it is assumed that all transfers will actually be 20 bytes (burst length of 5). Alternatively, if two quad transfers are required because of system limitations, all additional data must be discarded. This method increases bus loading significantly and is thus, not the preferred method. For the first and last "row", the extra 2 bytes will be discarded. The blocks are the same size for portrait as landscape once they reach the MCU pixel buffer 409, and ring pixel insertion is done in the same way. However, the data is read in by columns rather than rows. The data is rearranged in the Pixel Shuffle block 411. The DMA transfers 32 lines of 20 bytes each for portrait mode. But support for fewer than 32 lines is required for the end of a scan row. In which case, there is available a full set of eighteen pixels at the last "row", since all image widths supported are divisible by sixteen. Pixels outside of the MCU at the right or along the bottom, assuming that the image is not a multiple of 16, are filled with black or are appropriately handled in subsequent blocks.

Next, the pixel MCU buffer 409 holds the data for processing by the interpolate block 408. The 5×5 interpolate block 408 performs a 5×5 matrix operation from 20×20 inputs to form a 16×16 MCU of RGB data. The exact form of the matrix values must be determined. The number of bits of resolution for the matrix coefficients must also be determined, given a 10 bit input resolution. The preferred embodiment includes having the interpolation block 408 and edge enhancement block 407 be a programmable DSP, thereby allowing various algorithms to be used. During the interpolation process, all results must be clipped to the maximum and minimum values.

Block 407 performs edge enhancement. This effectively detects edges in different directions when computing averages for missing color restoration during the interpolation process. This process is best integrated into the Interpolation process of block 408. The output from these blocks 407–408 is preferably CCIR 709 RGB data, having been reconstructed from the Bayer pattern, color corrected, feature enhanced, and gamma corrected. Fine AWB can also be performed in this stage, if required, by adjusting the matrix values appropriately. There is one R, G, and B output value for each of 16×16 pixels. This data is transferred directly to the gamma correction block 414 as it is computed, pixel by pixel.

It is the function of the color space convert block 415 to convert the 8-bit gamma corrected data from RGB space to YCC 422 space (subsampling to 411, when selected, is done as part of the JPEG block 205). The output from this stage is a 16×16 array of Y values, and two 16×8 arrays of Cr and Cb values. This gamma correction block 414, in its simplest embodiment, is essentially a 3×3 matrix with programmable matrix values. Assuming that the JPEG compression engine 205 processes one block while the other block is being loaded, double buffering is performed. Thus, two 512 byte buffers are used. The registers for this block 414 are nine coefficient registers. Assuming 10 bit values, these can be arranged as three 30-bit registers. Note that different color space conversions can be supported: Photo YCC for FlashPix, and CCIR 709 for JPEG. Both of these transformations are required at the same time when Photo YCC is used, since the data going to the resizer for Live View or Instant Review must always be CCIR 709. In addition, during decompression (playback support), Photo YCC must be converted to CCIR 709, since data space used in the frame buffer is only CCIR 709. A determination must be made if the same block with programmable coefficients can do both conversions. It may be necessary to have three blocks: RGB to Photo YCC, RGB to CCIR YCC, and Photo YCC to CCIR YCC. Alternative embodiments of the image processing stages from the MCU input buffers to the YCC buffers are contemplated to be within the scope of the present invention. Furthermore, different solutions are possible, depending on the required quality of the conversion.

The YCC MCU buffer 204 holds one or two MCU's in YCC 422 format. In order to support custom processing of images as they pass from conversion to YCC on to compression, direct access to this memory is preferred from the CPU. In this case, the CPU must be able to tell the JPEG 205 and resizer 206 blocks when the custom modifications are completed on a block. Also, an interrupt must be used to tell the CPU when a block is available for processing. It may be preferable to require custom processing on uncompressed data in memory. This requires a buffer twice the size of the capture buffer, however, but allows full image access for simplified image processing rather than MCU access.

The JPEG/IJPEG block 205 performs either a JPEG compression of an MCU, or a JPEG decompression of an MCU. In the first case, data is retrieved from the MCU buffer 204, and the results are output to the FIFO. In the IJPEG case, the data is taken from FIFO 416, and output to the MCU 204. The JPEG/IJPEG function can operate in 422 and 411/420 modes via a programmable register. When operating in 411/420, the JPEG block 205 must do the averaging from 422 to 411, or IJPEG up sample from 411 to 422 in the preferred embodiment. The MCU block 204 is only a 422 format block. A control register must be included to set for 411 compression vs. 422. Additionally, two control bits must be included to set the data flow direction (i.e., compress, decompress, or off).

The resize block 206 takes as input the MCU data from either the color space convert 415, IJPEG, or YCC shuffle 208 blocks, and resizes and repackages it for use in the LCD frame buffer. The LCD buffer may be operating in 216 line 1/2 vertical resolution mode (single repeated field) or in 432 line full interlace mode. Both modes may be supported by this block. In either case, the horizontal resolution is 576 (YCC 422). The buffer is thus 1152 bytes by 216 lines or 1152 by 432 lines. This covers the "safe area" of NTSC video. Note that this data must always be CCIR YCC. Thus, for playback mode, where Photo YCC is being generated by IJPEG, conversion back to CCIR YCC must occur before the data goes to the Resizer 206.

There are four resize cases to consider:
1) Live View mode: data is always in landscape mode, the input data is always from 288 to 512 pixels wide, and the LCD buffer is always in 1/2 vertical resolution mode (216 lines).
2) Capture mode and Instant Review: data can be in any of the three orientations, but must still be viewed in landscape mode, since this is still Live View of the data as it is being captured. Therefore, this is also always in 1/2 vertical resolution mode (216 lines). Since the image processing section of the ASIC may have rotated the image for processing, the data must be "unrotated" for display on the LCD. This is done as a second step, using the memory to memory rotation path to be described below.
3) Playback mode: data can be in any of the three orientations, and must be resized depending on orientation. For Landscape, the image should be 1152 bytes or 576 pixels wide (YCC 422) by 432 lines high. For Portraits, the image should be 648 bytes or 324 pixels wide by 432 lines high. Note that half of the lines are tossed (not output to memory) if 1/2 vertical resolution mode is being used.

4) Playback zoom mode: this is the same as Playback mode, except the image displayed is a movable window on an image. This is either the "1 to 1" mode, where 1 LCD pixel equals 1 image pixel, or the "1 to 2" mode, where 4 LCD pixels equals 1 image pixel. If half vertical resolution (216 line) is used, half of the lines will be thrown away.

A 2K buffer 419 is interposed between the resize block 206 and padding overlay bars block 420 to temporarily store data. Since less than 1152 bytes per line may be generated by the resizer 206 in some cases, this block must pad the left and right side of the data to fill the LCD. The assumption is that any padding on the top and bottom will be handled by software by setting the appropriate starting address. Further, it is assumed that hardware padding will only be required when the starting address cannot be used to center the image. This is only true for 16 byte padding. This is the case for 320, 448, 640, 896, 1280, and 1792. This also assumes that octal DMA is used and must be on 32 byte boundaries. If quad DMA is used with 16 byte boundaries, hardware padding will not be required.

Overlay bar generation is another function of block 420. This should only be active when an entire LCD buffer is being generated. Thus, this function should be turned off when images smaller than 288×216 are being resized. The overlay function is capable of producing two "bars" of image data at 50% luminance (Y value divided by 2). This is defined by two "start line" and "end line" values.

A data path is shown in the block diagram for data to DMA directly into the YCC Shuffle block 208, and then into the MCU buffer 204. This path allows in-memory image data to be rotated and resized, or compressed. The primary purpose for this path is to rotate the LCD buffer image generated during portrait capture. This case is the "instant review" while the camera is still being held in the portrait position. If the camera is then turned into the landscape position, the image must be resized and rotated. The resize factor is 12/16 (3/4 ratio). It can also be used to generate compressed screen-nail, if desired.

The pixel shuffle block 208 performs a different kind of shuffle here than for the Bayer pattern normally transformed. Basically, the YCC 422 data are broken up into a 16×16 block of Y's, and two 8×16 blocks of Cr and Cb. These are shuffled. The Cr/Cb blocks are transformed after shuffle from 16×8 to 8×16. An averaging or linear interpolating filter may be used for this transformation. Finally, the YCC Shuffle block 208 should have a bypass mode, allowing the data path to be used for resizing or compression only. This would be used to do second-pass resize for already-rotated JPEG images. Since the initial resize will always be to the LCD buffer size assuming landscape, a second pass through the resizer is required to reduce to 75% for portrait. This second pass is required assuming integer resize only in Resize block (N out of 16). There are cases where thumbnail generation would be desirable. One way to accomplish this is to run an image through the resizer 206 a second time. For example, to generate a 3×3 thumbnail display of a "event bracket" capture, resizing 16:5 would give a good result. An alternative embodiment is to have a direct path only, or YCC shuffle (rotate) is done in software. This is a good trade-off since the image is fairly small and can be processed in software quickly.

The NTSC to PAL Resize block 418 generates 720 (CCIR) or 768 (Square Pixel) horizontal pixels from the incoming 640 NTSC pixels when PAL mode is selected. Also, six lines are generated for every five incoming lines for PAL mode. This is accomplished using a line buffer (1280 or 1152 bytes) and stopping the 8xx video controller during the sixth line. The currently preferred method is bilinear interpolation.

The LCD/Video generator block 417 generates composite video, component video, and RGB data for direct drive LCD's. Both analog and digital forms are available. In an alternative embodiment, an "anti-flicker" block can be added to this function. Another alternative feature for the LCD/Video generator is fade capability. This can be a multiplier on the Y channel. The Y value would be multiplied by a value from 0 to 64 for a 64 step fade. A 256-step multiplier value could be supported, so the fader software could use the proper "curve" to effect a linear visual effect. This function could be used for fade-in and fade-out capability during playback. In another embodiment, a separate data path be added to process graphic overlay buffers and 1152×216 image buffers into a single 576×216 data format. This would reduce the bus bandwidth by 10% during LCD refresh.

Hence, an image processing system for high performance digital imaging has been described. The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the Claims appended hereto and their equivalents.

What is claimed is:

1. A method for processing an image in an image capture unit including a display, the method comprising the steps of:
    capturing raw image data;
    processing the raw image data through a capture data path, wherein the capture data path comprises statistic generation, pixel averaging, and compression;
    storing the raw image data in a first memory, wherein the first memory contains raw image data for one or more images;
    accessing a particular raw image data from the first memory and performing image processing on the particular raw image data to produce a rotated processed image;
    loading the processed image in a second buffer;
    compressing the processed image to generate a compressed image;
    unrotating the image;
    performing display processing to produce graphics for display;
    storing the graphics and image in a fourth buffer; and
    rendering the graphics and image from the fourth buffer for display on the image capture unit.

2. A method for processing an image in an image capture unit including a display, the method comprising the steps of:
    capturing raw image data;
    processing the raw image data through a capture data path;
    storing the raw image data in a first memory, wherein the first memory contains raw image data for one or more images;
    accessing a particular raw image data from the first memory and performing image processing on the particular raw image data through an image processing data path to produce a rotated processed image, wherein the image processing data path comprises edge enhancement, interpolation, ring insertion, pixel shuffle, line averaging, and decompression;

loading the processed image in a second buffer;

compressing the processed image to generate a compressed image;

unrotating the image;

performing display processing to produce graphics for display;

storing the graphics and image in a fourth buffer; and rendering the graphics and image from the fourth buffer for display on the image capture unit.

3. In a digital camera, a method for digital image processing, comprising the steps of:

generating a live view image for display with the digital camera in a horizontal, vertical, or upside-down orientation;

capturing an image for subsequent display, wherein the image is captured with the digital camera in either a horizontal or vertical orientation;

rendering a captured image for instant review with the digital camera in either the horizontal or vertical orientation and with the captured image rotated or not rotated;

rendering the captured image for a play mode of operation with the digital camera in either the horizontal or vertical orientation and with the captured image rotated or not rotated;

rotating the image when the digital camera is in the vertical orientation to produce a horizontal image;

storing the horizontal image in memory;

rotating the horizontal image from memory for displaying the live view;

resizing the horizontal image for instant review or play mode if the digital camera is in a horizontal orientation;

displaying a resized horizontal image with a predetermined background on either side of the resized horizontal image;

displaying an indication that the horizontal image was taken when the digital camera was in the vertical orientation;

rotating the horizontal image in a second pass if the digital camera is physically rotated to the vertical orientation.

4. A digital signal processor for use in an image capture apparatus, comprising:

a bus a capture data path coupled to the bus for accepting CCD data and outputting raw lines to the bus, wherein the capture data path includes a statistics circuit, a pixel average circuit, and a compression circuit;

a memory coupled to the bus for storing the raw lines;

a data flow controller coupled to the bus for generating raw minimum computational units (MCUs) based on the raw lines stored in the memory;

an image processing data path for processing the raw MCUs from the data flow controller;

a buffer for storing the MCU's from the image processing data path;

a JPEG engine for compressing the MCU's before storage in the memory and for decompressing MCU's read from the memory;

a resize circuit coupled to the buffer for resizing image data;

a display processor coupled to the resize circuit for generating graphical information for display with the image data;

a rotation circuit coupled to the bus for rotating the image data and storing a rotated image data in the buffer.

5. A digital signal processor for use in an image capture apparatus, comprising:

a bus a capture data path coupled to the bus for accepting CCD data and outputting raw lines to the bus;

a memory coupled to the bus for storing the raw lines;

a data flow controller coupled to the bus for generating raw minimum computational units (MCUs) based on the raw lines stored in the memory;

an image processing data path for processing the raw MCUs from the data flow controller;

a buffer for storing the MCU's from the image processing data path;

a JPEG engine for compressing the MCU's before storage in the memory and for decompressing MCU's read from the memory;

a resize circuit coupled to the buffer for resizing image data;

a display processor coupled to the resize circuit for generating graphical information for display with the image data;

a rotation circuit coupled to the bus for rotating the image data and storing a rotated image data in the buffer, wherein at least four modes of operation are supported: live view, image capture, instant review, and play mode, and wherein the image is automatically rotated in a second pass in accordance with a current physical orientation of the image capture apparatus and with the physical orientation of the image capture apparatus when the image was captured.

6. The digital signal processor of claim 5, wherein in the live view mode of operation, the image from the capture data path is stored in an input buffer of the memory, retrieved and processed by the image processing path, buffered, resized if necessary, and displayed along with any appropriate graphics.

7. The digital signal processor of claim 6, wherein if the image capture apparatus is in a vertical orientation, the image is rotated by the rotation circuit before being stored in the memory and the image is rotated again before being rendered for display.

8. The digital signal processor of claim 5, wherein in a capture mode of operation, the image from the capture data path is stored in an input buffer of the memory, retrieved and processed by the image processing path, buffered, compressed by the compression/decompression engine, and stored in a file of the memory.

9. The digital signal processor of claim 8, wherein if the image capture apparatus is currently in a horizontal orientation and the image was taken while the image capture apparatus was in a vertical orientation, the image is reduced in size before being rendered for display.

10. The digital signal processor of claim 9, wherein the display processor generates an indication to the user to change the orientation of the image capture apparatus and when the image capture apparatus is rotated to be in the vertical orientation, the image is rendered for display without resizing.

11. The image capture apparatus of claim 5, wherein in an instant playback mode of operation, the image from the capture data path is stored in an input buffer of the memory, retrieved and processed by the image processing path, buffered, compressed by the compression/decompression engine, stored in a file of the memory, read back from the file, decompressed, resized if necessary, and displayed along with any appropriate graphics.

12. The image capture apparatus of claim 5 further comprising an orientation detector for detecting a current physical orientation of the image capture apparatus, wherein the image from a first draw buffer is rotated by the rotation circuit, depending on the current orientation, and stored in a second draw buffer.

13. The image capture apparatus of claim 5, wherein in a playback mode of operation, one or more requested files are read, decompressed, resized if necessary, and displayed along with any appropriate graphics.

14. The image capture apparatus of claim 5 further comprising an orientation detector for detecting a current physical orientation of the image capture apparatus, wherein the image from a first draw buffer is rotated by the rotation circuit, depending on the current orientation, stored in a second draw buffer, and displayed in a correct orientation.

15. A digital signal processor for use in an image capture apparatus, comprising:
   a bus
   a capture data path coupled to the bus for accepting CCD data and outputting raw lines to the bus;
   a memory coupled to the bus for storing the raw lines;
   a data flow controller coupled to the bus for generating raw minimum computational units (MCUs) based on the raw lines stored in the memory;
   an image processing data path for processing the raw MCUs from the data flow controller;
   a buffer for storing the MCU's from the image processing data path;
   a JPEG engine for compressing the MCU's before storage in the memory and for decompressing MCU's read from the memory;
   a resize circuit coupled to the buffer for resizing image data;
   a display processor coupled to the resize circuit for generating graphical information for display with the image data;
   a rotation circuit coupled to the bus for rotating the image data and storing a rotated image data in the buffer;
   a double buffered register, wherein transfers of data between buffers is activated at frame boundaries;
   wherein at least four modes of operation are supported: live view, image capture, instant review, and play mode.

16. The image capture apparatus of claim 5 further comprises a YCC shuffle block having a data path coupled directly to the buffer.

17. A method for processing an image in an image capture unit including a display, the method comprising the steps of:
   capturing raw image data with an image sensor;
   processing the raw image data through a capture data path;
   transferring the raw image data from the image sensor to a first memory via a bus for storage, wherein the first memory contains raw image data for one or more images;
   transferring a particular raw image data from the first memory to a data flow control via the bus;
   passing the raw image data from the data flow control to an image processing data path, the image processing data path for performing image processing on the particular raw image data to produce a rotated processed image;
   transferring the processed image from the image processing data path to a second buffer through a first dedicated path;
   establishing a data path between the second buffer an a compression/decompression engine;
   compressing the processed image to generate a compressed image;
   transferring the compressed image from the compression/decompression engine to a third buffer via the bus to store a compressed displayable image;
   retrieving the compressed displayable image from the third buffer for decompression by the compression/decompression engine to produce displayable image data;
   transferring the displayable image data to the second buffer;
   transferring the displayable image data from the second buffer to a resize circuit through a second dedicated path;
   performing display processing to produce graphics for display;
   transferring the graphics and displayable image to a fourth buffer via the bus;
   loading the graphics and displayable image from the fourth buffer to a rotate circuit through the bus;
   unrotating the displayable image;
   rendering the graphics and displayable image from the fourth buffer for display on the image capture unit; and
   establishing a third dedicated path from the rotate circuit to the second buffer.

18. A method for processing an image in an image capture unit including a display, the method comprising the steps of:
   capturing raw image data;
   processing the raw image data through a capture data path;
   storing the raw image data in a first memory, wherein the first memory contains raw image data for one or more images;
   accessing a particular raw image data from the first memory and performing image processing on the particular raw image data to produce a rotated processed image;
   loading the processed image in a second buffer;
   compressing the processed image to generate a compressed image;
   unrotating the image;
   performing display processing to produce graphics for display;
   storing the graphics and image in a fourth buffer;
   rendering the graphics and image from the fourth buffer for display on the image capture unit; and
   performing a second pass when the image capture unit is rotated, the second pass comprising the steps of:
   accessing the image from the fourth buffer;
   rotating the image;
   storing the image in the second buffer;
   passing the image through a resize circuit;
   adding the graphics during the second pass; and
   storing the image in a fifth buffer.

* * * * *